Feb. 21, 1933.  E. W. DAVIS  1,898,003
LUBRICATING SYSTEM
Original Filed Aug. 23, 1924   2 Sheets-Sheet 1
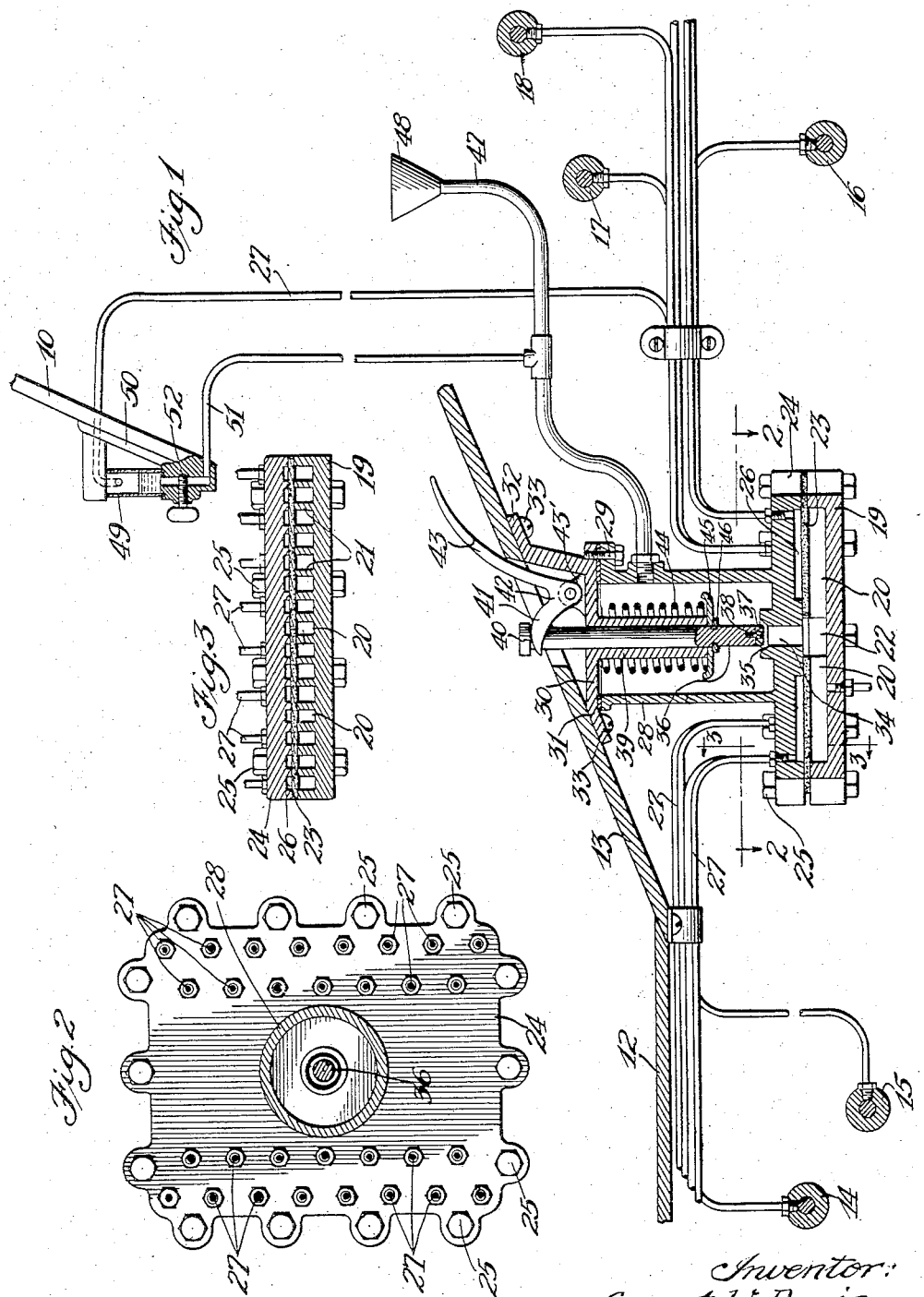
Inventor:
Ernest W. Davis.
By Williams, Bradbury, McColl & Hinkle.
Attys.

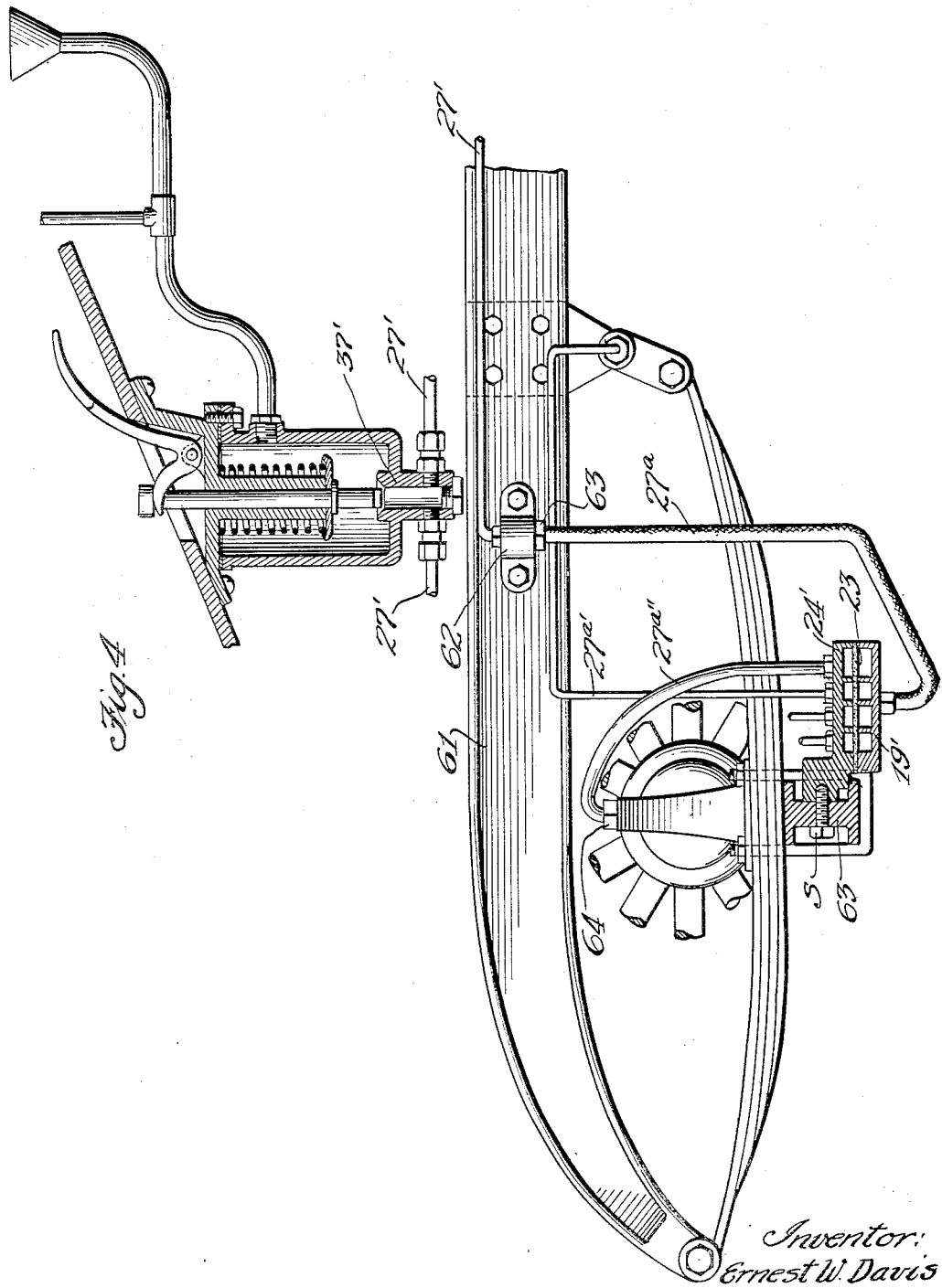

Patented Feb. 21, 1933

1,898,003

UNITED STATES PATENT OFFICE

ERNEST W. DAVIS, OF OAK PARK, ILLINOIS, ASSIGNOR TO ALEMITE CORPORATION, OF CHICAGO, ILLINOIS, A CORPORATION OF DELAWARE

LUBRICATING SYSTEM

Original application filed August 23, 1924, Serial No. 733,765. Divided and this application filed January 24, 1930. Serial No. 423,039.

My invention relates to improvements in lubricating systems, and this application is a division of my prior application Serial No. 733,765, filed August 23, 1924 for lubricating systems. My present invention is particularly concerned with the provision of a novel system for lubricating the chassis bearings of an automobile or other automotive vehicle. It is to be clearly understood, however, that my invention is not limited to this particular adaptation or use, but may be used for lubricating any kind of machinery.

The objects of my invention are:
*First.*—To provide a lubricating system in which one or more bearings can be lubricated from a single point.

*Second.*—To provide a lubricating system by means of which one or more bearings can be lubricated with a single effort on the part of the operator.

*Third.*—To provide a lubricating system comprising a plurality of bearings to be lubricated, a single source of lubricant under pressure, and means for conducting the lubricant from the source to the several bearings.

*Fourth.*—To provide a lubricating system such as described comprising means for automatically proportioning the lubricant in accordance with the demand of the several bearings.

*Fifth.*—To provide a lubricating system such as described, comprising means for preventing dirt, water, and other foreign matter from entering and clogging the pipe or conduit leading to the bearings; and

*Sixth.*—To provide a system of the character described, that is simple in construction, economical to manufacture, and easy to operate.

Other objects of my invention will appear as this description progresses, reference being had to the accompanying drawings, in which:

Figure 1 is a more or less diagrammatic view, partially in section, showing certain details of construction of one embodiment of my invention.

Figure 2 is a section taken on line 2—2 of Figure 1.

Figure 3 is a section taken on line 3—3 of Figure 1.

Figure 4 is another view similar to Figure 1, but showing a modified form of my invention.

Throughout the several views similar reference characters are used for referring to similar parts and the sections are taken looking in the directions of the small arrows.

In that embodiment of my invention illustrated in Figures 1 to 3 inclusive, I have shown portions of the dash 10 and the floor boards 12 and 13. I have also shown diagrammatic views of the bearings 14, 15, 16, 17 and 18 that are intended to represent certain chassis bearings to be lubricated by the means about to be described. The pump forming a part of my invention, comprises a base plate 19, having a series of parallel grooves 20 corresponding in number to the number of bearings to be lubricated. The partitions 21 separating the grooves 20 are cut away adjacent the center thereof to form a longitudinally extending passageway 22 to connect or establish communication between all of the grooves 20.

A sheet of leather 23 covers the open sides of the grooves 20, and is clamped to the base plate by means of the cover plate 24 and suitable bolts or screws 25.

The lower face of the cover plate 24 has a plurality of grooves 26 formed therein and positioned opposite to the grooves 20 in the base plate.

A conduit 27 extends from each of the grooves 26 to one of the bearings to be lubricated. For the purpose of supplying lubricant under pressure to the several bearings 12 to 18 inclusive, I provide a reservoir or receptacle 28 which is adapted to hold a quantity of lubricant sufficient to lubricate a vehicle for any desired period of time. This reservoir is preferably made integral with the cover plate 24 and has secured thereto, by means of screws 29, the cap 30, that has projecting therefrom lugs or brackets 31 and 32. Screws 33 secure these lugs or brackets to the floor board 13 and in this manner the reservoir 28, the base plate 19, cover plate 24 and the pump mechanism about to be described are supported from the floor board 13.

The cover plate 24 is provided with a central bore 34 that extends therethrough, and opens into the passageway 22. Preferably the upper end of the bore 34 is counterbored as shown at 35, to insure the proper registration of the inner end of the plunger 36. The plunger 36 preferably terminates in a cup-leather 37 that is held in place by means of the screw 38. The plunger 36 is reciprocably mounted in the cap 30 and the inwardly extending tubular bearing 39. At its outer end, the plunger is provided with a head 40 that is engaged by the bifurcated end of the bell crank lever 42. This lever is pivotally mounted upon a lug 43' extending upwardly from the cap 30 and comprises a central arm 43 that extends upwards above the floor board 13, so that the operator, by pushing upon this lever with his foot or hand, can lift the plunger 38 to the position shown in Figure 1, against the tension of the spring 44 that surrounds the bearing 39. One end of this spring contacts with the cap 30, and the other end abuts the disc 45 that surrounds the plunger 36 and is supported by a spring washer 46 which cooperates with an annular groove in the plunger 36.

From the above description it will be apparent that when the plunger is lifted to the position shown in Figure 1, lubricant, which is preferably oil, will pass from the reservoir 28, through the bore 34 and into the groove 20. When all of the grooves and the bore 34 have been filled and the operator releases pressure upon the lever 43, the plunger 36 will move downwardly into the bore 34 under tension of the spring 44 and thereby displace the lubricant in the bore 34. The lubricant thus displaced will cause a corresponding displacement of lubricant through the leather septum 23 and into the grooves 26. When the system is first placed in operation it will be necessary for the operator to repeat the operation just described a number of times in order to fill the various conduits with lubricant, but thereafter, as soon as the plunger 36 moves into the bore 34, lubricant will be forced into the several conduits 27 and into the various bearings to be lubricated.

As described above, my system is particularly adapted to be used for lubricating the chassis bearings of an automobile or other automotive vehicle, in which the resistance of the several bearings to the passage of lubricant therethrough, vary through a comparatively wide range. One bearing may require practically no pressure to insure the passage of oil therethrough, while another bearing may require a pressure of from 10 to 40 or 50 pounds per square inch to insure its proper lubrication.

To make certain that each bearing will receive its proper share of lubricant, I make use of a filtering material 23 the resistance of which is high compared to the resistance of various bearings. I have found that for this purpose, oak-tanned, snuff-grained, cowhide of approximately $\frac{3}{16}$ of an inch in thickness is satisfactory.

My invention is not, however, limited to the use of this particular material but contemplates the use of any material having sufficient porosity to permit the passage of lubricant, but at the same time, having a resistance that is high compared with the resistance of any one of the bearings to be lubricated. For instance, if the maximum pressure required for lubricating a bearing is 40 or 50 pounds per square inch, I prefer to make use of a material that will require a pressure of from 100 to 250 pounds per square inch to insure the passage of lubricant therethrough and into the bearing. In this manner, that is, in making the resistance of the filter high, as compared to the resistance of the several bearings, I am enabled to insure the proper proportioning of the lubricant to the various bearings.

For filling the reservoir 28, I prefer to provide a pipe 47 that leads through from some point that is easily accessible. The upper end of this pipe preferably terminates in a funnel 48. I prefer to include in the system visible means for indicating to the operator that the system is, or is not, operating properly, and for this purpose I carry one end of one of the pipes 27 to the upper end of a sight feed glass 49, supported by a suitable bracket 50 located on the dash 10. A pipe 51 leads from the lower end of the sight feed glass 49 to the pipe 47 so that any lubricant passing through the sight feed glass can be returned to the receptacle 28.

By observing whether or not oil drips from the end of the pipe 27 into the sight feed glass 49 when pressure has been applied, and then released, from the lever 43, the operator can ascertain whether the system is functioning properly. For the purpose of warning the operator when the supply of lubricant in the reservoir 28 is about to become exhausted, I prefer to place a valve 52 at the lower end of the sight feed glass 49 so as to retain the oil in the sight feed glass, that is discharged therefrom by the pipe 27. By properly proportioning the capacity of the sight feed glass 49, and the area of the filtering material controlling the passage of lubricant to the pipe 27, the pipe or column of oil trapped in the sight feed glass 49 can be made to bear a certain relation to the quantity of lubricant in the reservoir 28, so that the operator will know that when the level of the oil in the sight feed glass 49 reaches a certain point, the lubricant in the reservoir 28 is substantially exhausted. When the reservoir 28 is filled, the operator by opening the valve 52 can permit the oil to drain from the sight feed glass 49 back into the receptacle and, by then closing the valve, can place the apparatus in condition to indicate to the operator the quantity of oil or lubricant remaining in the reservoir 28.

In Figure 4 I have illustrated a modified construction that may be used with the system described. This system is designed particularly for use upon parts of an automobile or other mechanism that move relatively to that part of the automobile or mechanism upon which the lubricant pump is mounted. In this form of my invention a conduit 27′ leads from the lower end 37′ of a lubricant pump generally similar to that heretofore described, and is supported on a side member 61 of the automobile chassis by a clip 62, or in any other suitable manner. This clip also supports a union 63 for connecting the conduit 27 with a section of flexible conduit 27a that in turn connects with the base plate 19′ similar to that shown in Figures 1 to 3 inclusive. A cover plate 24′ is secured to the axle 63 by means of a screw S, and a base plate 19′ which co-acts with a porous septum 23′ is attached to cover plate 24′, all of these parts being similar to the parts shown in Figure 1. Suitable conduits 27a connect the grooves and cover plate with the various bearings carried by the axle 63, as for instance, a kingpin bearing 64.

By making use of "headers" similar to that formed by the base plate 19′, septum 23′ and cover plate 24′ that are carried by relatively moving parts, I am enabled easily to supply lubricant to such bearings, without the necessity of making use of a flexible conduit for each of the bearings.

While I have described the details of construction of the preferred embodiment of my invention, it is to be clearly understood that my invention is not limited to these details, but is capable of other adaptations and modifications, within the scope of the appended claims.

Having thus described my invention, what I claim is:

1. A lubricating system comprising a plurality of bearings to be lubricated, and a pump for supplying lubricant to said bearings, said pump comprising a base plate having a series of parallel grooves in one side thereof, said base plate being provided with a passageway for establishing communication between said grooves, a sheet of leather covering the open sides of said grooves, a cover plate disposed over said piece of leather and clamped to said base plate, said cover plate having a plurality of separated grooves disposed oppositely to the grooves in said base plate, a conduit leading from each of the grooves in said cover plate to one of said bearings, a cylinder communicating with said passageway, a reservoir for supplying lubricant to said cylinder, a plunger for displacing lubricant from said cylinder, a spring for actuating said plunger, and means for tensioning said spring.

2. A lubricating system comprising a plurality of bearings to be lubricated, and a pump for supplying lubricant to said bearings, said pump comprising a base plate having a series of grooves in one side thereof, said base plate being provided with a passageway for establishing communication between said grooves, a sheet of leather covering the open sides of said grooves, a cover plate disposed over said piece of leather, said cover plate having a plurality of separate compartments disposed oppositely to the grooves in said base plate, a plurality of conduits, one leading from each of said compartments in said cover plate to one of said bearings, a cylinder communicating with said passageway, a reservoir for supplying lubricant to said cylinder, and a plunger for displacing lubricant from said cylinder.

3. A lubricating system comprising a plurality of bearings to be lubricated, and a pump for supplying lubricant to said bearings, said pump comprising a base plate having a series of interconnected grooves in one side thereof, a sheet of leather covering the open sides of said grooves, a cover plate disposed over said piece of leather, said cover plate having a plurality of separate compartments, each disposed oppositely one of the grooves in said base plate, a plurality of conduits, one leading from each of said compartments to one of said bearings, a reservoir for supplying lubricant to the grooves in said base plate, and means for placing the lubricant in said last named grooves under pressure.

4. A lubricating system comprising a plurality of bearings to be lubricated, and a pump for supplying lubricant to said bearings, said pump comprising a base plate having a series of grooves in one side thereof, a sheet of leather covering the open sides of said grooves, a cover plate disposed over said piece of leather and having compartments disposed oppositely to the grooves in said base plate, a conduit leading from each of said compartments to one of said bearings, and means for supplying lubricant under pressure to the grooves in said base plate.

5. A lubricating system comprising a plurality of bearings to be lubricated, and a pump for supplying lubricant to said bearings, said pump comprising a plate having a plurality of compartments formed therein, a conduit leading from each of said compartments to one of said bearings, a sheet of leather covering the open sides of said compartments, means for holding lubricant in contact with the face of said sheet opposite said grooves, and means for placing said lubricant under pressure.

6. In a lubricating system of the class described, the combination of a source of lubricant, a displacement pump, a plurality of bearings to be lubricated, a single filtering element for said bearings, said element having one side exposed to lubricant pressure from said pump, and means for separating and conducting lubricant passing through different portions of said element to different ones of said bearings, whereby lubricant will be apportioned among the said bearings in substantially the proportion of the relative cross sectional areas of the portions of said element through which lubricant is supplied to the respective bearings.

7. In a lubricating system of the class described, the combination of a plurality of bearings to be lubricated, a source of lubricant under pressure, a single lubricant flow resistance element having one side thereof subjected to lubricant under pressure from said source, and means for segregating the lubricant passing through different portions of said element and conducting the segregated lubricant to different ones of said bearings, whereby lubricant will be apportioned among said bearings in substantially the proportion of the relative cross sectional areas of the portions of said element through which lubricant may flow to the respective bearings.

8. A lubricating system including a plurality of bearings to be lubricated, a source of lubricant under pressure, a filtering unit, a conduit connecting said source to said filtering unit, and a plurality of conduits extending from different portions of said filtering unit to said bearings respectively, each of said conduits deriving lubricant only from its respective portion of said filtering unit.

9. A lubricating system including a plurality of bearings to be lubricated, a pump for supplying lubricant to said bearings, a filtering unit remotely situated from said pump, conduit means from said pump to said filtering unit, said filtering unit comprising a base plate having a series of grooves in one side thereof, said base plate being provided with a passageway for establishing communication between said grooves, a cover plate disposed over said filtering unit, said cover plate having a plurality of compartments disposed oppositely to the grooves in said base plate, filtering means positioned between said base plate and said cover plate and a conduit leading from each of the grooves in said cover plate to one of said bearings.

10. In a lubricating system including a plurality of bearings to be lubricated, a source of lubricant under pressure, a filtering and flow restricting element having one side thereof exposed to lubricant under pressure from said source, and means for separating the portions of lubricant flowing through different predetermined sections of said element and conducting the separated portions of lubricant each to a different bearing.

In witness whereof, I hereunto subscribe my name this 14th day of January, 1930.

ERNEST W. DAVIS.